United States Patent [19]
Laaman et al.

[11] Patent Number: 5,629,041
[45] Date of Patent: May 13, 1997

[54] LOW CALORIE SANDWICH COOKIES

[75] Inventors: Thomas R. Laaman, Bordentown; Christopher J. Sewall, Princeton, both of N.J.

[73] Assignee: FMC Corporation, Philadelphia, Pa.

[21] Appl. No.: 272,891

[22] Filed: Jul. 8, 1994

[51] Int. Cl.$^6$ .............. A23L 1/0534; A23L 1/09; A23L 1/308

[52] U.S. Cl. .............. 426/659; 426/572; 426/573; 426/804

[58] Field of Search .............. 426/659, 572, 426/573, 804, 103

[56] References Cited

U.S. PATENT DOCUMENTS

| | | | |
|---|---|---|---|
| 4,526,799 | 7/1985 | Glicksman et al. | 426/553 |
| 4,774,095 | 9/1988 | Kleinschmidt et al. | 426/94 |
| 5,192,569 | 3/1993 | McGinley et al. | 426/96 |
| 5,366,750 | 11/1994 | Morano | 426/572 |

OTHER PUBLICATIONS

Approved Methods Of The American Association Of Cereal Chemists vol. II; Water Hydration Capacity—AACC Method 88-04 Oct. 27, 1982.

*Primary Examiner*—Jeanette Hunter
*Assistant Examiner*—Choon P. Koh
*Attorney, Agent, or Firm*—Polly E. Ramstad; Robert L. Andersen

[57] ABSTRACT

A reduced calorie sandwich cookie wherein the weight percent of fat and/or oil of the cookie filler is reduced by at least one quarter and replaced by a predominantly non-caloric bulking agent having a water absorptivity of 200% or less while maintaining the water activity of the entire filler at from 0.2 to 0.7.

30 Claims, No Drawings

LOW CALORIE SANDWICH COOKIES

BACKGROUND OF THE INVENTION

1. Field of the Invention

This invention relates to reduced calorie sandwich cookies, in which from 25 to 100 wt % of the fat or oil component in the filler is replaced by a low-moisture, non-oleagenous matrix comprising dry sugar, a high solids sugar syrup, an optional non-aqueous and non-oleagenous liquid, and one or more non-caloric or low-caloric bulking agents having a water absorptivity of 200% or less, wherein the filler has a total water activity of between 0.2 and 0.7.

2. Statement of Related Art

Sandwich cookies in which a sweet, cream-type filler is located between two base cakes (flat outer cookie layers or wafers) are well known, and typically contain two opposed chocolate or vanilla flavor outer base cakes with a chocolate, vanilla, or other flavor filler between them. The majority of calories in such a cookie is found not in the base cakes, but rather in the filler itself which typically contains 35 wt % of a solid fat such as lard or solidified (hydrogenated) liquid oil, and 65 wt % sugar, with minor additional amounts (less than 1%) of flavor, color, and other ingredients. Sandwich cookies of this type are very tasty and popular, but have a relatively high caloric value, mostly attributable to the solid fats or solidified oils contained in their filler, which also are undesirable ingredients because of their contribution to the generation of cholesterol within the body. A frequent solution to excess fat/oil is to replace it by sugar. However, this does not work in a sandwich cookie filler because when the fat/oil is reduced below about 25% the remaining amount of fat/oil is inadequate to bind the sugar into the fat/oil matrix, with resulting crumbling and loss of filler material.

BRIEF SUMMARY OF THE INVENTION

This invention affords a reduced calorie cookie filler formulation in which at least one quarter by weight of the high calorie fat or solidified oil based matrix of the filler is replaced by a lower calorie matrix that is water based. The inventive filler formulation is characterized particularly by the presence of a total water activity of at least 0.2 and not more than 0.7 and for maximum calorie reduction contains a bulking agent. The inventive filler also is characterized by a reduction of the usual 35 wt % fat/oil content (based on the total weight of the filler) to from 0% to a maximum of 25%. While a fat/oil content of 0 to 10% is preferable for low caloric content a 5 to 10% fat/oil content is preferable for its organoleptic qualities. The bulking agent may be any food grade ingredient having fewer calories than fat or oil and a maximum water absorptivity of 2× (200%), always provided that the total water activity of the filler remains within the specified limits. Acceptable bulking agents include non-caloric ingredients such as microcrystalline cellulose (MCC) alone or coprocessed or in combination with other, preferably lower calorie, ingredients when in a form processed so as to have the required low water absorptivity. Sugars, especially low-calorie sugars, may serve as a portion of the bulking agent where it replaces fat/oil, since fat/oil has 9 calories per gram whereas sugars have a maximum of only 4 calories per gram. However the use of sugars alone as a bulking agent may not sufficiently reduce the total caloric value of the sandwich cookie, especially since the base cakes themselves typically may contain 14% fat.

Many known fat replacers emulate the texture and mouthfeel of fat by absorbing water. Such an approach is inadequate in a sandwich cookie filler since free (unbound) moisture in the filler can migrate to the outer base cakes, causing them to become soggy or spoil. Thus, it is critically important to maintain the water activity of the filler above a minimum level of 0.2 in order to replicate the desired organoleptic characteristics of the high fat/oil sandwich cookies, while also maintaining the water activity level below a maximum value of 0.7 to prevent or at least minimize the migration of excess (unbound) moisture in the filler to the surrounding base cake portions, as well as to prevent microbial (particularly yeast and mold) growth facilitated by the presence of free water. Merely replacing the fat/oil with additional sugar creates a very dry and crumbly filler that does not have the desired creamy consistency of the full fat product and does not remain between the base cakes.

A sandwich cookie made with the inventive low-fat filler, and using standard full-fat base cakes, typically will reduce the total fat content of the sandwich by 42%, resulting in a 13% reduction in total calories.

DETAILED DESCRIPTION OF THE INVENTION

As used herein, all percentages of ingredients are weight percentages unless stated otherwise. Other than in the operating examples, or where otherwise indicated, all numbers expressing quantities of ingredients, parameters, and reaction conditions used herein are understood as modified in all instances by the term "about".

The use of a water based matrix for a sandwich cookie filler presents several problems caused by the presence of the water, amongst which are: microbial growth enabled by the presence of moisture in the cookie filler; and softening of desirably crisp outer base cakes by absorption of moisture from the filler. It was discovered that these problems could be avoided by suitable formulation of the filler so as to retain just sufficient water (moisture) to enable its manufacture, preferably by binding the water to other filler ingredients so that it was not available for microbial growth or transference to the outer base cakes. Most importantly, it was determined that the amount of water present in the filler, as measured by the "water activity" must be between 0.2 and 0.7, (preferably between 0.3 and 0.6, more preferably between 0.51 and 0.59). Thus, in one embodiment, the present invention affords a filler for a sandwich cookie comprising a water-based matrix having a water activity of approximately 0.55, preferably where the usual amount of fat or solidified oil (normally 35% of the total filler) is reduced by at least one quarter (to 26% fat/oil or less), more preferably where it is reduced by at least one half (18% fat/oil or less), most preferably where it is reduced by at least three quarters (to 9% fat/oil or less). For organoleptic reasons, it may be preferable to retain a relatively small amount of fat/oil in the filler, so that the normal 35% fat/oil content is reduced to about 5% of the total filler. Stated in terms of the amount of fat/oil in the total filler, and bearing in mind that the usual amount in fillers of this type is 35 wt %, the total fat/oil content of the inventive fillers should be 0 to 25 wt %, preferably 2 to 20 wt %, more preferably 5 to 15 wt %. Because of organoleptic considerations, it is most preferred to retain 5 to 10 wt % of fat/oil in the filler.

The measurement of water activity as used herein was made by using an AquaLab Water Activity Meter model CX2, a product of Decagon Devices, Inc., Pullman, Wash., U.S.A.

Paraphrasing and partially quoting from the Operators Manual for the above device, "water activity" is a water energy measurement. It is an indication of "free" water in a sample, "free" referring to the water particles in a product that are not chemically or physically bound. The water activity or "equilibrium relative humidity" is measured as a ratio of the water vapor pressure above any sample to the water vapor pressure of pure water at the same temperature. Products with no "free water" will have a water activity of 0.000, while pure water has a water activity of 1.000.

There are two basic types of water analysis. The first is a quantitative or volumetric analysis to determine the water content of a product, in which instance, typically, the product is first weighed, then baked and reweighed to measure its total water content. But merely knowing the water content of a product does not give an indication of the qualitative properties of that water.

The second type of water analysis is a qualitative or energy measurement. Energy measurements define the amount of unbound water in a product. Because microorganisms require water for survival, too much "free" water in a product can serve as a medium for microbial reproduction, travel, and contamination. But if water within a product is held with enough force, microorganisms will not be able to exert the energy required to obtain water necessary for their subsistence.

Energy measurements are influenced by potentials that affect the binding of water. These include matric potentials, chemical bonding energies, osmotic potentials, gravity potentials, and pressure potentials. Matric, chemical bonding, and osmotic potentials are very important in their relation to water activity in foods. By altering any of these potentials, the water activity of a product may also be altered.

Matric potential in a food product refers to the product's structure and its ability to hold water within that structure through surface tension. Chemical bonding energy refers to the energy of chemical/water bonds within a product. Osmotic potential refers to the energy a microorganism might exert on a product in order to take on water. If the water within a product is tightly bound, a microorganism will find it hard to survive.

The natural tendency of any substance is to equilibrate itself to the ambient humidity. Measuring water activity helps to determine how "free" water in a product affects its quality, safety, and shelf-life. Where the product is a compound product, such as a sandwich cookie having a filler and base cakes composed of unrelated substances having very different water activities, the amount of free water in the filler becomes particularly critical.

The AquaLab™ device used for all water activity measurements in the disclosure of this invention uses the chilled mirror dewpoint technique for measuring water activity. This technique is a primary measurement method of relative humidity. When a sample is measured with the AquaLab device, a stainless steel mirror within a sensing chamber is repeatedly cooled and heated while dew forms and is driven off. The instrument's fan circulates air in the sensing chamber, speeding up this equilibrium process. Each time dew forms on the mirror, the device measures the temperature and water activity of the sample, saving these values to compare to previous values as it repeats its readings. When the water activity values of consecutive readings are less than 0.001 apart, the measurement process is complete. The AquaLab device then signals and gives the final water activity value and temperature of the product. As stated by the manufacturer, the AquaLab device has a few limitations. One of these is the measurement of propylene glycol, which vaporizes on the surface of the chilled mirror and alters accurate readings. Not all volatiles react in this way; glycerol is no problem and most other alcohols used in foods are also measureable. The AquaLab device also may have trouble measuring extremely dry substances with a water activity of less than 0.03. Some very dry or dehydrated foods absorb or desorb moisture in such a way that their readings may take longer than five minutes, although such extremes are not encountered in this invention. This invention is not limited to the use of a particular device, however, and any comparable device for measuring the water activity as that term is used herein would be adequate.

The second critical parameter in this invention is that when a bulking agent is used, it should have a water absorptivity of 200% or less. Water absorptivity is measured by Approved Method 88-04 of the American Association of Cereal Chemists (AACC) for measurement of "Water Hydration Capacity of Protein Materials", first approved Sep. 26, 1978 and reviewed Oct. 27, 1982. This method defines Water Absorptivity as the maximum amount of water that 1 g of material will imbibe and retain under low speed centrifugation. Since only enough water is added to saturate the sample and not enough to cause a liquid phase, the measurement is not affected by the solubility of the material being tested. This method is applicable to protein flours, concentrates, and isolates of vegetables or animal origin that consist of native, modified, or denatured protein. It also is applicable to other materials such as pregelatinized starch products in which water uptake is an important characteristic. It therefore is particularly suitable for measuring the water absorptivity of the cellulosic materials that comprise the bulking agents useful herein, and has been used for this purpose in industry for several years.

In order to achieve the desired water activity level of this invention, filler ingredients should be chosen which bind water and do not release it to the surrounding environment. For example, the use of sugar syrup as the sweetener in addition to dry sugar acts to introduce a relatively small amount of water which is bound to the sweetener and is not available for microbial growth or for migration into the outer base cakes. The sugar syrup can be derived from any of the known sources such as cane, beet, hydrolyzed corn starch, and the like. Since the fat/oil component is the major source of calories, the sugar component is relatively unimportant as a calorie source. Even the small amount of water in a sugar syrup (such as corn syrup) acts to form a sugar-based matrix which is effective to replace the higher calorie fat/oil-base matrix. The sugar syrup is preferably a high fructose corn syrup, although any sugar syrup with a DE (dextrose equivalent) of 42 to 100 should be adequate. The most important element in the sugar syrup is the percentage of solids, since the water content may be critical. Thus a 65 to 80% solids syrup is preferred, more preferably 70 to 80% solids, most preferably 75 to 80% solids. The sugar syrup should be present in the filler in a total amount of 18 to 32 wt %, preferably 20 to 25 wt %.

The sugar syrup is present in addition to the dry sugar normally contained in a sandwich cookie filler. The dry sugar may be present in 35 to 70 wt %, preferably 40 to 65 wt %, more preferably 50 to 60 wt %.

A non-oleagenous, non-aqueous food grade liquid polyhydric alcohol may be present as an optional ingredient in amounts of 0 to 40 wt % (preferably 2 to 20%, more preferably 3 to 15 wt %, most preferably 5 to 12 wt %). Useful polyhydric alcohols include glycerin (glycerol) and propylene glycol, glycerin being preferred. Sorbitol, mannitol, and the like, also may be used but only in small quantities due to their occasionally deleterious digestive effect.

A food grade emulsifier such as lecithin also may be present as an optional ingredient in amounts of 0 to 3.0 wt % (preferably 0.1 to 3.0 wt %, more preferably 0.5 to 1.5%), although this usually is not needed when the polyhydric alcohol is present.

Natural or artificial food grade flavoring also may be present, but does not form a part of this invention. The flavoring may be vanilla, chocolate, fruits such as strawberry, cherry, or the like. The flavoring (and small amounts of table salt where desired) are in addition to the 100 wt % of base ingredients, and are not included therein. The flavoring is to taste, and usually amounts to less than an additional 1.0 wt %, although where cocoa is used as a chocolate flavor it may be as much as an additional 5 wt %. The only limitation on the flavoring is that where it is water-based, the flavoring should not raise the water activity above the stated maximum of 0.7.

In the preferred embodiment of this invention, a non-caloric or low-caloric bulking agent is used in the sandwich cookie filler provided that it has a water absorptivity of 200% (that is, two times its weight) or less, preferably less than 150%, more preferably less than 100%. This is a lower than usual water absorptivity for food grade bulking agents, and most importantly does not bind sufficient water to make it available to support microbial growth or to migrate into the surrounding base cakes. The bulking agent should be present in up to 40 wt %, preferably 5 to 20 wt %, more preferably 8 to 15 wt %. Useful bulking agents include food grade non-caloric ingredients such as cellulose (alpha cellulose) or hemicellulose (beta & gamma cellulose), and low-caloric ingredients such as inulin (a low-calorie sugar extracted from chicory root, dahlia tubers, and Jerusalem artichoke, among others) or polydextrose. As used herein, the term "cellulose" includes: highly purified particulate cellulose whose particle size varies from <1 to 150 microns which is commonly known as microcrystalline cellulose (MCC); non-colloidal MCC, preferably including that which has been processed so as to reduce its water absorptivity; and MCC which has been coprocessed with various other food grade substances such as barrier dispersants including carboxymethyl cellulose or alginate salt complexes; gums including guar, konjac, locust bean, and carrageenan, and other substances including starches; always provided, however, that their water absorptivity is below the specified maximum of 200%.

A particularly useful form of MCC is described in U.S. Pat. No. 5,192,569 which is incorporated herein by reference. This patent discloses a bulking agent which is a substantially water-insoluble, yet water dispersible, coprocessed aggregate of microcrystalline cellulose and guar gum in powder form which is characterized in having particles that are spheroidal in shape and which, when added to foodstuffs, are of a resilient consistency such as to impart effective fat-like organoleptic qualities. Products according to the claims of U.S. Pat. No. 5,192,569 are manufactured and sold by FMC Corporation, Food Ingredients Division, Philadelphia, Pa., U.S.A. under the trademark Novagel® using various grade designations, including: Novagel RCN-10 (10 wt % guar), Novagel RCN-15 (15 wt % guar), and Novagel 200 (a mixture of Novagel RCN-15 and carrageenan).

Other food grade MCC bulking agents useful in this invention are manufactured and sold by FMC Corporation, Food Ingredients Division, Philadelphia, Pa., U.S.A. under the trademarks Avicel® and Indulge™, using various grade designations.

EXAMPLES

General Mixing Procedure

[1] A sugar syrup, an optional non-aqueous non-oleageneous liquid such as glycerin, and a shortening [lard or an oil which has been at least partially solidified, such as by hydrogenation] were combined, and mixed using a Hobart-type mixer at low speed. [2] While continuing to mix at low speed, a cellulosic dry powder bulking agent as disclosed herein was added and incorporated. [3] After all of the bulking agent was incorporated, a powdered sugar was added. Steps [2] and [3] were reversible, that is, alternatively, the bulking agent was added last. While a liquid oil can be substituted for the solidified oil in small amounts, it is not preferred since liquid oil not completely bound within the filler mass might migrate into the base cakes. Mixing was continued until all ingredients were formed into a filler mass. The parameters of mixing are not critical to this invention, and no particular mixing speed or equipment is required, nor is heating. As would be expected in mixing such ingredients, and as is known in the art, it is important not to allow portions of the ingredients to "set up" before all are mixed. This is easily avoided by not permitting undue delays between adding the sugar and adding the bulk filler elements of the ingredients, in a manner well known in the art.

Example 1

The following low fat filler formulation was prepared according to the above general procedure:

| ingredient | wt % |
| --- | --- |
| sugar syrup (fructose, 77% solids) | 20 |
| non-aqueous, non-oleagenous liquid (glycerin) | 6 |
| bulking agent (low water absorption cellulose♥) | 10 |
| shortening | 5 |
| dry sugar (sucrose powder) | 59 |
| | 100 |
| [plus salt and flavoring as needed, usually >1 wt % additional] | |

♥Novagel RCN-10, a coprocessed MCC/guar product of FMC Corp., Phila., PA, U.S.A.

The filler formulation of Example 1 had a water content of 4.6% and a water activity of 0.47 as measured by an AquaLab Water Activity Meter model CX-2.

Comparison Example A (Full Fat)

A comparison filler according to the prior art was prepared in the same general manner as above.

| ingredient | wt % |
| --- | --- |
| shortening (Crisco) | 35 |
| sugar (10X powdered) | 65 |
| salt and flavoring as needed | |
| | 100 |

Because there was almost no moisture in this system, a measurement of the water activity of the Comparison Example A was considered probably inaccurate.

Example 2

The following Reduced Fat Standard formulation was developed according to this invention. It had a measured water activity of 0.471, and was considered an acceptable substitute for a full fat filler. A large number of variations of this formulation was tried in which the percentages of ingredients were varied within the parameters disclosed herein, compensating for changes in percent level of ingredients by adjusting the level of powdered sugar. All of these were found to be successful and within the scope of this invention.

| ingredient | wt % |
|---|---|
| fructose syrup (77% solids) | 20 |
| glycerin | 6 |
| Novagel RCN-10 (coprocessed MCC/guar) | 14 |
| shortening (Crisco) | 10 |
| powdered sugar (10X) | 50 |
| | 100 |

Example 3 (Alternative Sugar)

The following reduced fat filler according to this invention also included polydextrose, a sugar having only about 1 calorie/gram. It had a measured water activity of 0.459. The polydextrose was not dissolved, resulting in a less desirable gritty texture, although this in itself could be a desirable organoleptic characteristic, depending upon the flavor of the filler. While it normally is not preferred, in further experimentation it was determined that polydextrose could substitute for up to 10 wt % (preferably 4 to 8 wt %) of the total filler weight when used as a bulking agent in place of dry sugar, thus further reducing the total calories in the filler.

| ingredient | wt % |
|---|---|
| fructose syrup (77% solids) | 20 |
| glycerin | 6 |
| Novagel RCN-10 (coprocessed MCC/guar) | 7 |
| polydextrose | 7 |
| shortening (Crisco) | 10 |
| powdered sugar (10X) | 40 |
| | 100 |

Example 4

The following reduced fat filler was produced according to this invention. It had a measured water activity of 0.502.

| ingredient | wt % |
|---|---|
| fructose syrup (77% solids) | 30 |
| glycerin | 6 |
| Novagel RCN-10 (MCC/guar) | 14 |
| shortening (Crisco) | 10 |
| powdered sugar (10X) | 40 |
| | 100 |

Example 5

The following reduced fat filler was produced according to this invention. It had a measured water activity of 0.433.

| ingredient | wt % |
|---|---|
| fructose syrup (77% solids) | 20 |
| glycerin | 6 |
| Novagel RCN-10 (MCC/guar) | 9.4 |
| polydextrose | 4.6 |
| shortening (Crisco) | 10 |
| powdered sugar (10X) | 50 |
| | 100 |

Examples Comparative B, 6, 7

Comparative sensory testing was conducted on fillers with 35% fat (prior art), 10% fat (invention), and 5% fat (invention), with the following results:

| Example: ingredient | Comparative B 35% (full) fat (%) | 6 10% fat (%) | 7. 5% fat (%) |
|---|---|---|---|
| fructose | 0 | 20 | 25 |
| glycerin | 0 | 6 | 6 |
| shortening (Crisco) | 35 | 10 | 5 |
| dry sugar | 64.5 | 49.5 | 53.5 |
| vanilla | .5 | .5 | .5 |
| Indulge ™ LM-310♥ | 0 | 14 | 10 |
| | 100 | 100 | 100 |

| calculations/measurements | B 35% fat | 6 10% fat | 7. 5% fat |
|---|---|---|---|
| calories/100 g | 573 | 375 | 362 |
| % reduction | 0 | 35 | 37 |
| water activity | | .50 | 0.493 |

| sensory test results | B 35% fat | 6 10% fat | 7. 5% fat |
|---|---|---|---|
| astringency | 0 | 2 | 4 |
| dry/crumbly | 0 | 9 | 7 |
| slippery/adhesive | 0 | 10 | 11 |
| melt, slow–fast | 12 | 0 | 0 |
| particle, amount | 8 | 10 | 13 |
| particle size | .5 | 8 | 9 |
| greasy mouthfeel | 15 | 5 | 4 |
| residual drying | 0 | 12 | 14 |
| cohesiveness of mass | 10 | 4 | 6 |

♥ a trademark of FMC Corp., Food Ingredients Division, Philadelphia, PA, U.S.A. for a hornified MCC particulate The above sensory results indicate that the reduced fat formulations of inventive Examples 6 and 7 compare favorably with the full-fat Comparative Example B which is representative of commercially available fillers. It should be noted that satisfactory sensory results were achieved with Example 7, which has only 5 wt % fat, but which has a higher level of fructose than Example 6. Based on these sensory results, it may be concluded that favorable organoleptic qualities can be maintained at very low fat levels by increasing the fructose level.

Example 8

The following chocolate flavored reduced fat filler was produced according to this invention. It had a measured water activity of 0.484.

| ingredient | wt % |
|---|---|
| fructose syrup (77% solids) | 22.1 |
| glycerin | 10.7 |
| Indulge ™ LM-310 | 9.0 |
| vegetable shortening | 4.4 |
| powdered sugar (10X) | 48.48 |
| vanilla | 0.5 |
| Dutched cocoa powder | 4.82 |
| | 100 |

Example 9

The following fillers were produced according to this invention. The textural strength was measured using an Instron Universal Testing Instrument™ Model 1011 with Series IX software. Two hundred grams of each sample was placed in a Kramer Shear Cell and the maximum force recorded. Measurements were taken after initial make up and after ten weeks of storage at room temperature (about 70° F.–21° C.). The organoleptic properties were somewhat improved with increasing fat level. One gram of filler was placed between two base cakes and the water activity of both were monitored over time. After ten weeks the water activity of the base cake and the filler equilibrated to around 0.30.

| Example: | 9a | 9b | 9c. |
|---|---|---|---|
| fat content (wt %): | 2.5 | 5.0 | 10.0 |
| ingredient | (%) | (%) | (%) |
| fructose syrup | 25 | 25 | 25 |
| glycerin | 6 | 6 | 6 |
| shortening (vegetable) | 2.5 | 5 | 10 |
| dry sugar (10X) | 56 | 53.5 | 48.6 |
| vanillin | .5 | .5 | .5 |
| Indulge ™ LM-310♥ | 10.0 | 10.0 | 10.0 |
| | 100 | 100 | 100 |
| INSTRON TEST RESULTS | | | |
| initial: | 36.3 | 27.6 | 19.0 |
| ten weeks: | 253.0 | 193.0 | 49.0 |

♥a trademark of FMC Corp., Food Ingredients Division, Philadelphia, PA, U.S.A. for a hornified MCC particulate The above data indicates that the filler tends to get stiffer over time. This stiffening can be minimized by using higher levels of fat/oil.

| WATER ACTIVITY (FILLER) TEST RESULTS | | | |
|---|---|---|---|
| initial: | 0.492 | 0.493 | 0.485 |
| ten weeks: | 0.316 | 0.319 | 0.317 |
| WATER ACTIVITY (BASE CAKE) TEST RESULTS | | | |
| initial: | 0.21 | 0.21 | 0.21 |
| ten weeks: | 0.316 | 0.313 | 0.326 |

Example 10

The following fillers were produced according to this invention. The textural strength was measured using an Instron Universal Testing Instrument™ Model 1011 with Series IX software. Two hundred grams of each sample was placed in a Kramer Shear Cell and the maximum force recorded. Measurements were taken after initial make up and after ten weeks of storage at room temperature (about 70° F.–21° C.). The organoleptic properties were somewhat improved with increasing fat level. One gram of filler was placed between two base cakes and the water activity of both were monitored over time. After ten weeks the water activity of the base cake and the filler equilibrated to around 0.30.

| Example: | 10a | 10b | 10c |
|---|---|---|---|
| glycerin content (wt %): | 6.0 | 9.0 | 12.0 |
| ingredient | (%) | (%) | (%) |
| fructose syrup | 25 | 25 | 25 |
| glycerin | 6 | 9 | 12 |
| shortening (vegetable) | 5 | 5 | 5 |
| dry sugar (10x) | 53.6 | 50.5 | 47.6 |
| vanillin | 0.5 | 0.5 | 0.5 |
| Indulge ™LM-310♥ | 10.0 | 10.0 | 10.0 |
| | 100 | 100 | 100 |
| INSTRON TEST RESULTS | | | |
| initial: | 27.6 | 12.8 | 9.5 |
| ten weeks: | 193.0 | 38.0 | 16.0 |

♥a trademark of FMC Corp., Food Ingredients Division, Philadelphia, PA, U.S.A. for a hornified MCC particulate The above data indicates that the filler tends to get stiffer over time. This stiffening can be minimized by using higher levels of glycerin.

| WATER ACTIVITY (FILLER) TEST RESULTS | | | |
|---|---|---|---|
| initial: | 0.493 | 0.468 | 0.431 |
| ten weeks: | 0.319 | 0.313 | 0.303 |
| WATER ACTIVITY (BASE CAKE) TEST RESULTS | | | |
| initial: | 0.21 | 0.21 | 0.21 |
| ten weeks: | 0.313 | 0.313 | 0.307 |

Comparative Example C

To demonstrate the effective of using a highly adsorptive bulking agent, a filler was made using the formulation of Example 2 except substituting a powdered cellulose, which had not been treated to minimize water absorption. The cellulose had a water absorptivity of 420%, which is outside the scope of this invention. Because of this high water absorptivity, it was difficult to incorporate all of the dry ingredients. Moreover, the resulting filler was dry and crumbly, and its organoleptic qualities did not resemble those of a full fat filler.

Example 11

Stability studies indicated that the reduced fat filler tended to get harder over time. It was found that this could be overcome by the addition of small amounts of lecithin in the filler mixture, as disclosed above in the Detailed Description. Further experimentation indicated that the same results could be achieved by increasing the amount of polyhydric alcohol (especially glycerin) in the formulation to those ranges disclosed above in the Detailed Description.

We claim:

1. In a sandwich cookie filler comprising approximately 35 wt % fat/oil and 65 wt % sugar, with up to 5 wt % additional flavoring and/or coloring ingredients, the improvement comprising lowering the calorie content thereof by reducing the total filler fat/oil content to less than 25 wt % and replacing the reduced portion of fat/oil with a sugar syrup having not less than 70% solids and a non-caloric or low-calorie bulking agent having a water absorptivity of 200% or less, while maintaining a water activity for the entire filler of between 0.2 and 0.7.

2. The filler of claim 1 wherein the water activity is maintained between 0.3 and 0.6.

3. The filler of claim 1 wherein the water activity is maintained between 0.51 and 0.59.

4. The filler of claim 1 wherein the bulking agent has a water absorptivity of 150% or less.

5. The filler of claim 1 wherein the bulking agent has a water absorptivity of 100% or less.

6. The filler of claim 2 wherein the bulking agent has a water absorptivity of 100% or less.

7. The filler of claim 3 wherein the bulking agent has a water absorptivity of 100% or less.

8. The filler of claim 1 wherein the bulking agent is a cellulose or hemicellulose, inulin, polydextrose, or a mixture thereof.

9. The filler of claim 8 wherein the cellulose is a microcrystalline cellulose.

10. The filler of claim 8 wherein the cellulose is a microcrystalline cellulose coprocessed with guar gum or konjac glucomannan.

11. The filler of claim 8 wherein the cellulose is a microcrystalline cellulose coprocessed with a carboxymethyl cellulose barrier dispersant.

12. The filler of claim 8 wherein the cellulose is a microcrystalline cellulose coprocessed with a sodium/calcium alginate complex barrier dispersant.

13. The filler of claim 8 wherein the cellulose is a hornified microcrystalline cellulose particulate.

14. The filler of claim 1 or 8 wherein the bulking agent is also comprised of a sugar syrup having a solids content of at least 70 wt %, said syrup being present in 15 to 35 wt % of the total weight of the filler.

15. The filler of claim 1 wherein a polyhydric alcohol is present in up to 40 wt %.

16. The filler of claim 14 wherein a polyhydric alcohol is present in up to 40 wt %.

17. The filler of claim 1 wherein a food grade emulsifier is present in up to 3.0 wt %.

18. The filler of claim 14 wherein a food grade emulsifier is present in up to 3.0 wt %.

19. The filler of claim 16 wherein a food grade emulsifier is present in up to 3.0 wt %.

20. A reduced calorie filler for a sandwich cookie comprising:

a) 0 to 25 wt % of at least one fat/oil;

b) not more than 65 wt % of at least one sugar;

c) not more than 4.0 wt % flavoring and coloring; and d) the balance q.s. to 100 wt % of a bulking agent comprising
microcrystalline cellulose, hemicellulose, microcrystalline cellulose coprocessed with a natural gum, inulin, polydextrose, or a mixture thereof;
with the provisos that (1) the bulking agent has a water absorptivity of 200% or less, and (2) the water activity for the entire filler is between 0.2 and 0.7.

21. The reduced calorie filler of claim 20 wherein said bulking agent comprises 0 to 20 wt % of said fat/oil.

22. The reduced calorie filler of claim 20 wherein said bulking agent comprises 0 to 15 wt % of said fat/oil.

23. The reduced calorie filler of claim 20 wherein said bulking agent comprises 0 to 10 wt % of said fat/oil.

24. The reduced calorie filler of claim 20 wherein said bulking agent comprises 5 to 25 wt % of said fat/oil.

25. The reduced calorie filler of claim 20 wherein said bulking agent comprises 5 to 15 wt % of said fat/oil.

26. The reduced calorie filler of claim 25 wherein said bulking agent comprises 5 to 10 wt % of said fat/oil.

27. In a sandwich cookie filler containing approximately 35 wt % fat/oil and 65 wt % sugar, the improvement comprising lowering the calories thereof by reducing the fat/oil content by at least one quarter, replacing the reduced portion of fat/oil with a dry sugar, a sugar syrup having not less than 70 wt % solids, a bulking agent having a water absorptivity of 200% or less, or their mixture, while maintaining a water activity for the entire filler of between 0.2 and 0.7.

28. A reduced calorie filler for a sandwich cookie comprising:

(a) 0 to 25 weight percent of at least one fat/oil;

(b) not more than 65 weight percent of at least one sugar;

(c) not more than 4.0 weight percent flavoring and coloring agent; and (d) from 5 to 20 weight percent of a hornified microcrystalline cellulose particulate having a water absorptivity of 200 percent or less and wherein the water activity for the entire filler is between 0.2 and 0.7.

29. The filler of claim 28 wherein the water absorptivity of the cellulose is less than 150 percent.

30. The filler of claim 28 wherein a polyhydric alcohol is present in an amount of 2 to 20 weight percent.

* * * * *